US007761225B2

(12) United States Patent
Vaughn

(10) Patent No.: US 7,761,225 B2
(45) Date of Patent: Jul. 20, 2010

(54) ROUTING METHOD AND SYSTEM

(75) Inventor: Garfield Winston Vaughn, South Windsor, CT (US)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 11/838,924

(22) Filed: Aug. 15, 2007

(65) Prior Publication Data

US 2009/0048767 A1  Feb. 19, 2009

(51) Int. Cl.
*G01C 21/00* (2006.01)
(52) U.S. Cl. .................................................. 701/201
(58) Field of Classification Search ................ 701/117, 701/118, 199, 200, 201, 202, 206–209, 213, 701/215; 340/988–991, 995.1, 995.13–995.14, 340/995.16, 995.19
See application file for complete search history.

(56) References Cited

U.S. PATENT DOCUMENTS 6,911,918 B2  6/2005  Chen
6,983,204 B2  1/2006  Knutson
2004/0119612 A1  6/2004  Chen
2005/0065711 A1  3/2005  Dahlgren et al.
2005/0248469 A1  11/2005  DeKock et al.
2006/0058950 A1*  3/2006  Kato et al. .................. 701/208

FOREIGN PATENT DOCUMENTS

WO   WP2005088578 A1   9/2005

\* cited by examiner

*Primary Examiner*—Kim T Nguyen
(74) *Attorney, Agent, or Firm*—Schmeiser, Olsen & Watts; John R. Pivnichny

(57) ABSTRACT

A routing method and system. The method includes receiving by a global positioning satellite (GPS) transceiver, a user profile comprising user preference data and destination location data. The GPS transceiver retrieves first geospatial coordinate values for a current location of the user and a destination location. The GPS transceiver processes the user profile and the first geospatial coordinate values to identify a geographical route for traveling from the current location to the destination location. The GPS transceiver retrieves current traffic speed/traffic density data and historical traffic speed/traffic density data associated with second geospatial coordinate values for various locations located along the first geographical route. The GPS transceiver processes the current traffic speed/traffic density data and the historical traffic speed/traffic density data to determine if the first geographical route comprises an efficient geographical route for the user.

24 Claims, 3 Drawing Sheets

ROUTING METHOD AND SYSTEM

FIELD OF THE INVENTION

The present invention relates to a method and associated system for generating and modifying a geographical route of travel for a user.

BACKGROUND OF THE INVENTION

Generating a custom map for a user typically requires a process that may be complicated and inaccurate. Accordingly, there exists a need in the art to overcome the deficiencies and limitations described herein above.

SUMMARY OF THE INVENTION

The present invention provides a routing method comprising:

receiving from a user, by a global positioning satellite (GPS) transceiver, a user profile comprising user preference data;

receiving from said user, by said GPS transceiver, destination location data defining a destination location for said user;

retrieving from a satellite, by said GPS transceiver, first geospatial coordinate values for a current location of said user and second geospatial coordinate values for said destination location;

first identifying, by said GPS transceiver, a first geographical route for traveling from said current location to said destination location, said first identifying based on said user profile, said first geospatial coordinate values, and said second geospatial coordinate values;

retrieving from a plurality of radar traffic speed/density receiving devices, by said GPS transceiver, a plurality of geospatial coordinate values for various locations located along said first geographical route;

retrieving from a first database, by said GPS transceiver, current real time traffic speed/traffic density data associated with each geospatial coordinate value of said plurality of geospatial coordinate values;

retrieving from a second database, by said GPS transceiver, historical traffic speed/traffic density data associated with each said geospatial coordinate value of said plurality of geospatial coordinate values;

performing, by said GPS transceiver, a trending analysis process on said current real time traffic speed/traffic density data;

performing, by said GPS transceiver, a historical analysis process on said historical traffic speed/traffic density data; and determining, by said GPS transceiver, if said first geographical route comprises an efficient geographical route for said user to travel from said current location to said destination location, said determining based on said user profile, results of said trending analysis process, and results of said historical analysis process.

The present invention provides a global positioning satellite (GPS) transceiver comprising a processor coupled to a computer-readable memory unit, said memory unit comprising instructions that when executed by the processor implement a routing method comprising:

receiving from a user, by said GPS transceiver, a user profile comprising user preference data;

receiving from said user, by said GPS transceiver, destination location data defining a destination location for said user;

retrieving from a satellite, by said GPS transceiver, first geospatial coordinate values for a current location of said user and second geospatial coordinate values for said destination location;

first identifying, by said GPS transceiver, a first geographical route for traveling from said current location to said destination location, said first identifying based on said user profile, said first geospatial coordinate values, and said second geospatial coordinate values;

retrieving from a plurality of radar traffic speed/density receiving devices, by said GPS transceiver, a plurality of geospatial coordinate values for various locations located along said first geographical route;

retrieving from a first database, by said GPS transceiver, current real time traffic speed/traffic density data associated with each geospatial coordinate value of said plurality of geospatial coordinate values;

retrieving from a second database, by said GPS transceiver, historical traffic speed/traffic density data associated with each said geospatial coordinate value of said plurality of geospatial coordinate values;

performing, by said GPS transceiver, a trending analysis process on said current real time traffic speed/traffic density data;

performing, by said GPS transceiver, a historical analysis process on said historical traffic speed/traffic density data; and determining, by said GPS transceiver, if said first geographical route comprises an efficient geographical route for said user to travel from said current location to said destination location, said determining based on said user profile, results of said trending analysis process, and results of said historical analysis process.

The present invention provides a computer program product, comprising a computer usable medium comprising a computer readable program code embodied therein, said computer readable program code adapted to implement a routing method within a global positioning satellite (GPS) transceiver, said method comprising:

receiving from a user, by said GPS transceiver, a user profile comprising user preference data;

receiving from said user, by said GPS transceiver, destination location data defining a destination location for said user;

retrieving from a satellite, by said GPS transceiver, first geospatial coordinate values for a current location of said user and second geospatial coordinate values for said destination location;

first identifying, by said GPS transceiver, a first geographical route for traveling from said current location to said destination location, said first identifying based on said user profile, said first geospatial coordinate values, and said second geospatial coordinate values;

retrieving from a plurality of radar traffic speed/density receiving devices, by said GPS transceiver, a plurality of geospatial coordinate values for various locations located along said first geographical route;

retrieving from a first database, by said GPS transceiver, current real time traffic speed/traffic density data associated with each geospatial coordinate value of said plurality of geospatial coordinate values;

retrieving from a second database, by said GPS transceiver, historical traffic speed/traffic density data associated with each said geospatial coordinate value of said plurality of geospatial coordinate values;

performing, by said GPS transceiver, a trending analysis process on said current real time traffic speed/traffic density data;

performing, by said GPS transceiver, a historical analysis process on said historical traffic speed/traffic density data; and determining, by said GPS transceiver, if said first geographical route comprises an efficient geographical route for said user to travel from said current location to said destination location, said determining based on said user profile, results of said trending analysis process, and results of said historical analysis process.

The present invention provides a process for supporting computer infrastructure, said process comprising providing at least one support service for at least one of creating, integrating, hosting, maintaining, and deploying computer-readable code in a global positioning satellite (GPS) transceiver, wherein the code in combination with the GPS transceiver is capable of performing a routing method, said method comprising:

receiving from a user, by said GPS transceiver, a user profile comprising user preference data;

receiving from said user, by said GPS transceiver, destination location data defining a destination location for said user;

retrieving from a satellite, by said GPS transceiver, first geospatial coordinate values for a current location of said user and second geospatial coordinate values for said destination location;

first identifying, by said GPS transceiver, a first geographical route for traveling from said current location to said destination location, said first identifying based on said user profile, said first geospatial coordinate values, and said second geospatial coordinate values;

retrieving from a plurality of radar traffic speed/density receiving devices, by said GPS transceiver, a plurality of geospatial coordinate values for various locations located along said first geographical route;

retrieving from a first database, by said GPS transceiver, current real time traffic speed/traffic density data associated with each geospatial coordinate value of said plurality of geospatial coordinate values;

retrieving from a second database, by said GPS transceiver, historical traffic speed/traffic density data associated with each said geospatial coordinate value of said plurality of geospatial coordinate values;

performing, by said GPS transceiver, a trending analysis process on said current real time traffic speed/traffic density data;

performing, by said GPS transceiver, a historical analysis process on said historical traffic speed/traffic density data; and determining, by said GPS transceiver, if said first geographical route comprises an efficient geographical route for said user to travel from said current location to said destination location, said determining based on said user profile, results of said trending analysis process, and results of said historical analysis process.

The present invention advantageously provides a simple method and associated system capable of generating a custom map for a user.

DETAILED DESCRIPTION OF THE INVENTION

Figure 1:
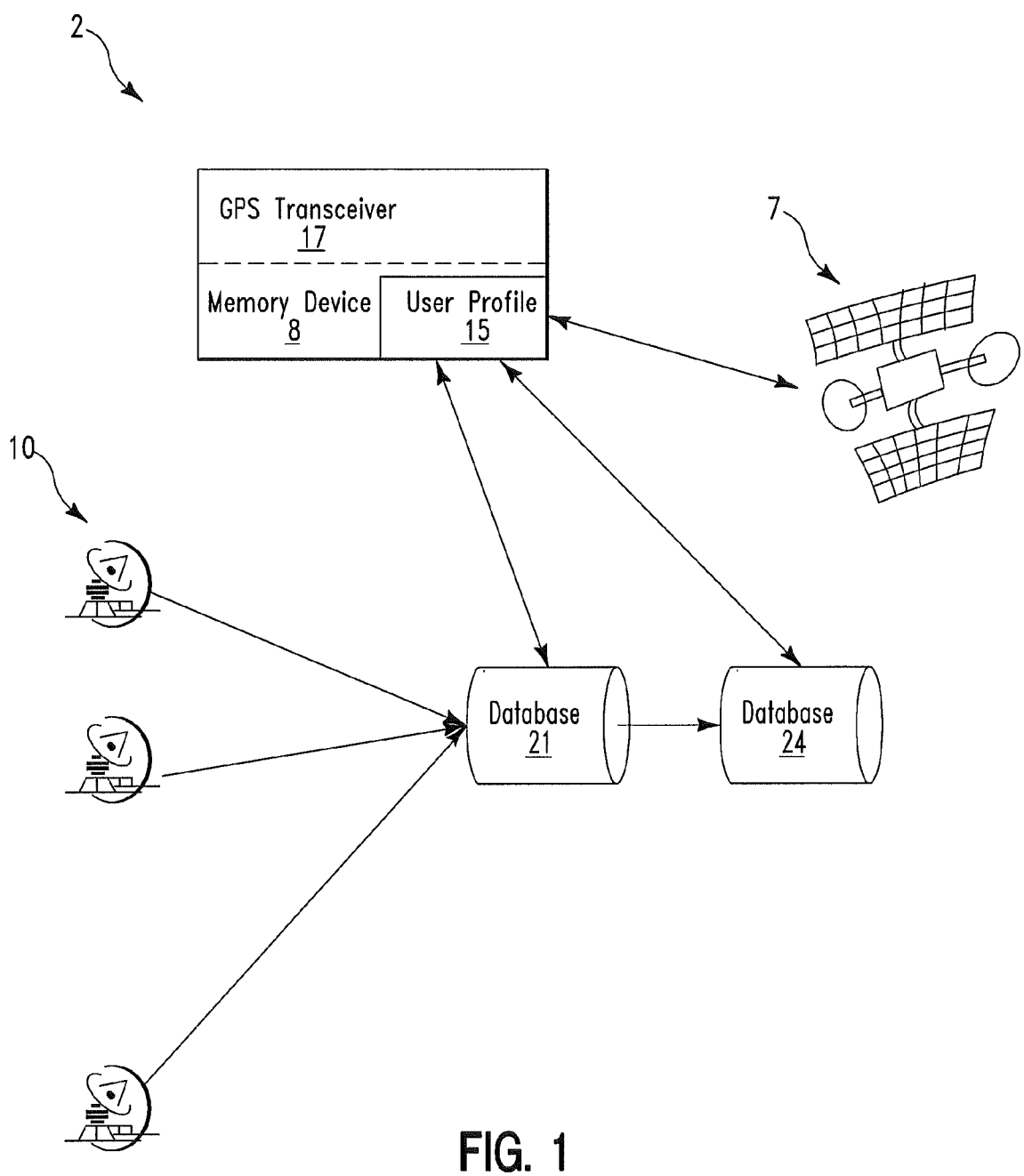
FIG. 1 illustrates an example of a block diagram of a system for generating and modifying a geographical route of travel for a user, in accordance with embodiments of the present invention.

FIG. 1 illustrates an example of a block diagram of a system 2 for generating and modifying a geographical route of travel for a user, in accordance with embodiments of the present invention. System 2 comprises a global positioning satellite (GPS) transceiver 17, a GPS satellite 7, a database 21, a database 24, and a plurality of radar traffic speed/density receiving devices 10 (e.g., radar devices). Database 21 comprises real time current data comprising geospatial coordinate values, date, time, and traffic speed/density information associated with a plurality of geographical locations. The real time current data from database 21 is retrieved by radar traffic speed/density receiving devices 10 and transmitted to database 21 for storage and transmission to GPS device 17. Database 24 comprises historical (i.e., past) data comprising geospatial coordinate values (i.e., geospatial data) date, time, and traffic speed/density information associated with a plurality of geographical locations. Geospatial data is defined herein as data or information that identifies a geographic location of features and boundaries on Earth (e.g., natural or constructed features, oceans, etc). Database 24 may retrieve and store the current data from database 21 for use as the historical data at a later time. GPS transceiver 17 uses a user defined profile 15 (i.e., inputted by a user and stored in a memory device 8 located within GPS transceiver 17), the real time current data from database 21, weather information retrieved by GPS satellite 7, geospatial coordinate values for a current location (i.e., for the user), and a destination location to dynamically generate and update a first geographical route (i.e., a most efficient route) for traveling from a current location (i.e., for the user) to the destination location. At any point in time, a remaining path (i.e., for the first geographical route) generated by GPS transceiver 17 is only adequate for the moment it displayed (i.e., by GPS transceiver 17). The first geographical route is refreshed (i.e., updated) and altered (e.g., a new geographical route is generated) based on user defined profile 15, the real time current data from database 21, the historical data from database 24, and weather information retrieved by GPS satellite 7. User profile 15 comprises user defined data that is used to aid in the generation and updating of the first geographical route. User profile 15 may comprise, inter alia, information related to a slowest speed on a highway that the user will tolerate before looking for another route, a willingness to be routed to local roads, acceptable state roads, towns or cities a user is willing to travel through, etc.

In order to initiate system 2 to generate and modify a geographical route of travel for a user, the user enables GPS transceiver 17. GPS transceiver 17 prompts the user to enter user defined profile 15. GPS transceiver 17 may prompt the user to enter a user profile by presenting the user with a series of questions. For example, GPS transceiver 17 may present the user with the following question: "What is the slowest speed on a highway that you are willing to travel at?". Answers to the questions presented to the user are used to generate the user profile. The user will also enter into GPS transceiver 17, a destination location. GPS transceiver 17 will retrieve (i.e., from GPS 7) geospatial coordinates for the user's current location and the user's destination location. Radar traffic speed/density receiving devices 10 are adapted to capture a number of automobiles that pass through particular locations along a road. Radar traffic speed/density receiving devices 10 are installed at strategic locations. Radar traffic speed/density receiving devices 10 will relay a speed at which traffic is traveling and a traffic density though the particular location of each device. The data retrieved from each of radar traffic speed/density receiving devices 10 is stored in database 21 which is used by GPS transceiver 17 to determine how traffic is flowing for that location of the road. Traffic density plays a significant role in a decision making process for generating a geographical route for the user. Radar traffic speed/density receiving devices 10 may be installed on, inter alia, utility poles, traffic signs, highway signs, any other permanent fixture that has good visibility to a flow of traffic, etc. Data is transferred from radar traffic speed/density receiving devices 10 to database 21 via wireless communication. Once the user enters the destination location, GPS transceiver 17 will communicate with the satellite (i.e., GPS 7) to retrieve the user's (i.e., and/or users vehicle) location. GPS transceiver 17 will access current traffic speed and density data from database 21. In order to determine a best possible geographical route for the user, GPS transceiver 17 will retrieve speed and density information (i.e., from database 21) for multiple geographical routes that could lead to the destination location based on the current location. The user is presented (i.e., by GPS transceiver 17) with a map and/or text directions detailing a first geographical route for traveling from the user's current location to the user's destination location. The map and/or text directions are generated using the data from database 21 and user profile 15. As the user travels along the first geographical route, conditions of various roads ahead may change (e.g., due to weather, constructions, an accident, etc) that would require a remapping of the first geographical route. Via a constant communication with GPS satellite 7 and database 21, a most efficient geographical route based on current road and weather conditions may be plotted.

Additionally, GPS transceiver 17 will retrieve historical speed and traffic density data for various locations along various possible routes based on an existing user location and destination location. The historical speed and traffic density data is retrieved from database 24. GPS transceiver 17 will use the historical speed and traffic density data, the current traffic speed and density data from database 21, and user profile 15 to provide alternative geographical routes based on an optimizing algorithm.

The current traffic speed and density data and the historical speed and traffic density data is analyzed (e.g., using a trending analysis, a historical trending analysis, etc) to provide input for determining alternative geographical routes. A trending analysis is defined herein as a use of data that when analyzed will provide information about a state of an entity that generated the data. The state may be classified in three ways: increasing, decreasing, or staying the same. A trend is increasing if a line drawn through these values when plotted on a chart (oldest point plotted first and the most recent point plotted last) has an upward slope. A trend is decreasing if a line drawn through these values when plotted on a chart (oldest point plotted first and the most recent point plotted last) has a downward slope. A trend is staying the same if a line drawn through these values when plotted on a chart (oldest point plotted first and the most recent point plotted last) is flat. For example, as a user travels a particular geographical route to a destination, real-time historical and trending assessment of different segments of the geographical route will be performed. Based on data that was assessed, information associated with the geographical route may be derived and alternative geographical routes may be generated for the user. The current traffic speed and density data may comprise any information related to current driving and traffic flow conditions, speed, etc. Historical speed and traffic density data may comprise any information related to driving and traffic flow conditions or speed conditions for the last few days, month, or months at a particular location for a given time frame. Therefore, GPS transceiver 17 retrieves current traffic speed and density data, recent historical speed and traffic density data, and past historical speed and traffic density data and assesses the data to determine whether traffic along the generated geographical route is improving or staying constant. The historical speed and traffic density data at a specified location along the generated geographical route is compared with the current speed and traffic density data to determine a current status of traffic. The current status of traffic along with historical trending of the past historical speed and traffic density data is used to determine traffic speed and density is at normal levels.

Figure 2:
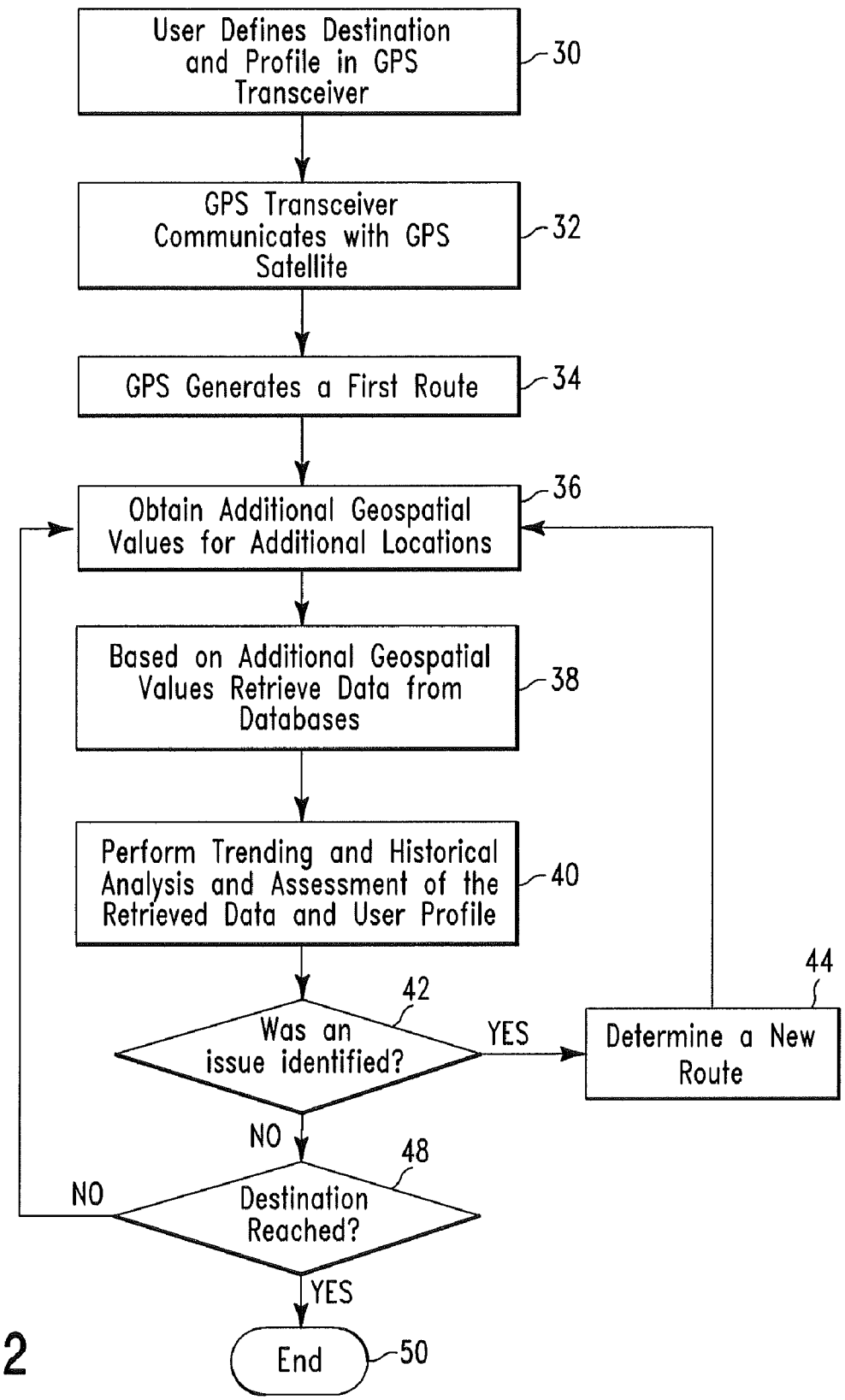
FIG. 2 illustrates an example of a flowchart describing an algorithm used by the system of FIG. 1 for generating and modifying a geographical route of travel for a user, in accordance with embodiments of the present invention.

FIG. 2 illustrates a flowchart describing an example of an algorithm used by system 2 of FIG. 1 for generating and modifying a geographical route of travel for a user, in accordance with embodiments of the present invention. In step 30, a user enters a destination location and user profile 15 into GPS transceiver 17. GPS transceiver 17 may be located in an automobile. In step 32, GPS transceiver 17 communicates with GPS satellite 7 in order to determine a current location of the user. GPS satellite 7 will use information provided by GPS transceiver 17 in order to determine geospatial coordinates for GPS transceiver 17. In step 34, GPS transceiver 17 uses the geospatial coordinates of the current location, a destination location, and user profile 15 (e.g., comprising shorted distance, shortest time, etc) to generate a first geographical route that satisfies the user's criteria. In step 36, GPS transceiver 17 will obtain geospatial values for various locations along the generated first geographical route from the current location to the destination location. The various locations may be obtained at any specified increments (e.g., every 1, 2, 5, 10, etc mile increment). The geospatial values for the various locations will allow GPS transceiver 17 to obtain current and historical information (i.e., from databases 21 and 24) about location segments yet to be traveled along the generated first geographical route. In step 38, GPS transceiver 17 uses the geospatial values from step 36 to retrieve associated data from database 21 (i.e., the real time database) and database 24 (i.e., the historical database) to obtain traffic speed and density data. Density data comprises a number of vehicles crossing a point over a period of time. For example, 20 vehicles per minute, 1000 vehicles per hour, etc. In step 40, GPS transceiver 17 uses the historical data to perform trending analysis and to calculate an average speed for a given location. There are many different types of average speed. For example, an overall average speed may not look at a time of day, a day of week, etc. As a second example, an average speed may be based on a time of day. A third example may be an average speed based on the time of the day and the day of the week. After the calculations and assessments are performed, user profile 15 will be evaluated in combination with the calculations and assessments in order to determine if there are any perceived issues at future point on the generated first geographical route from the current location to the destination location. In step 42 it is determined if an issue was discovered along the generated first geographical route.

If in step 42, it is determined that an issue was discovered along the generated first geographical route then in step 44, GPS transceiver 17 will communicate with GPS 7 in order to obtain current geospatial values (i.e., for the current location), a new geographical route is determined, and step 36 is repeated.

If in step 42, it is determined that an issue was not discovered along the generated first geographical route then in step 48, GPS transceiver 17 determines if the final destination has been reached. If in step 42, it is determined that the final destination has not been reached then step 36 is repeated. If in step 42, it is determined that the final destination has been reached then the process is terminated in step 50.

The following description illustrates an example of implementation for executing the algorithm of FIG. 2 within system 2 of FIG. 1 for generating and modifying a geographical route of travel for a user.

Currently a user in Springfield Mass. would like to drive to 123 1st Street in New York, N.Y. A user profile 15 is defined and stored in memory device 8. User profile 15 comprises the following rules:

1. If a speed is 25 mph slower than a posted sign and below a normal speed then change route.

2. If a trending over the last 10 minutes has reduced the speed by 30% and that is not the norm then change route.

3. If a speed is 40 mph below an expected average speed then generate a new route.

The user enters his/her destination location (i.e., 123 1st Street New York, N.Y.) into GPS transceiver 17. GPS transceiver 17 transmits a request to GPS satellite 7 in order to obtain the geospatial values for the current location. The geospatial values for the current location are: (Latitude: 4.2102499999999999E+01 Longitude: −7.2591600000000000E+01)

GPS transceiver 17 obtains geospatial values for the destination location (i.e., 123 1st Street New York, N.Y.). The geospatial values for the destination location are: (Latitude: 4.0731600000000000E+01 Longitude: −7.3989099999999993E+01).

GPS transceiver 17 uses both the geospatial values for the current location and the geospatial values for the destination location values to generate an initial first route of travel. GPS transceiver 17 uses the initial first route of travel to retrieve additional geospatial values for additional locations along the initial first route of travel. GPS transceiver 17 uses the additional geospatial values to submit a query to database 21 (i.e., real time database) and database 24 (i.e., historical database). The query to the real-time database may be to:

```
Select all where geospatial=(Latitude:
    4.1782600000000002E+01 Longitude−
    7.2661299999999997E+01) Hartford and current
    date and time−1 hr<=→date & time>=current
    date and time.
```

Table 1 below illustrates an example of data from database 21 (i.e., real time database).

TABLE 1

| Geospatial Value | Speed | Density (min) | Date/Time | Speed limit |
|---|---|---|---|---|
| (4.17 . . . 2E+01 −7.26 . . . 7E+01) | 56 | 30 | 03/01/2007:18:30 | 55 |
| (4.17 . . . 2E+01 −7.26 . . . 7E+01) | 57 | 33 | 03/01/2007:18:25 | 55 |
| (4.17 . . . 2E+01 −7.26 . . . 7E+01) | 54 | 29 | 03/01/2007:18:20 | 55 |
| (4.17 . . . 2E+01 −7.26 . . . 7E+01) | 55 | 30 | 03/01/2007:18:15 | 55 |
| (4.17 . . . 2E+01 −7.26 . . . 7E+01) | 56 | 30 | 03/01/2007:18:10 | 55 |
| (4.17 . . . 2E+01 −7.26 . . . 7E+01) | 58 | 32 | 03/01/2007:18:05 | 55 |
| (4.17 . . . 2E+01 −7.26 . . . 7E+01) | 56 | 30 | 03/01/2007:18:00 | 55 |
| Average | 56 | 30.6 | | |

Table 2 below illustrates an example of data from database 24 (i.e., historical database). Table 2 comprises 1 year historical averages.

TABLE 2

| Geospatial Value | Speed | Density (min) | Date/Time | Day of Week |
|---|---|---|---|---|
| (4.17 . . . 2E+01 −7.26 . . . 7E+01) | 55 | 30 | 03/01/2007:18:30 | Thursday |
| (4.17 . . . 2E+01 −7.26 . . . 7E+01) | 56 | 31 | 03/01/2007:18:25 | Thursday |
| (4.17 . . . 2E+01 −7.26 . . . 7E+01) | 54 | 30 | 03/01/2007:18:20 | Thursday |
| (4.17 . . . 2E+01 −7.26 . . . 7E+01) | 55 | 32 | 03/01/2007:18:15 | Thursday |
| (4.17 . . . 2E+01 −7.26 . . . 7E+01) | 56 | 30 | 03/01/2007:18:10 | Thursday |
| (4.17 . . . 2E+01 −7.26 . . . 7E+01) | 57 | 32 | 03/01/2007:18:05 | Thursday |
| (4.17 . . . 2E+01 −7.26 . . . 7E+01) | 57 | 32 | 03/01/2007:18:00 | Thursday |
| Average | 55.7 | 31 | | |

Using the data from tables 1 and 2 and a speed limit which was provided by the radar traffic speed/density receiving devices 10 that are located on utility poles, street signs, traffic lights and other objects that are strategically positioned by the road, GPS transceiver 17 will conclude that:

1. Over the past hour traffic has been stable averaging 56 mph with a density of 30.6.

2. Traffic is flowing slightly faster than the expected 55 mph posted speed limit and the speed and density is in-line with the historical values.

GPS transceiver 17 determines that no user profile 15 rules were violated and therefore no issues were identified. Additionally, GPS transceiver 17 determines that the destination location has not been reached (e.g., the user is presently located in Hartford, Conn.) so GPS transceiver retrieves additional geospatial values along the initial first route in order to submit another query to database 21 (i.e., real time database) and database 24 (i.e., historical database).

Figure 3:
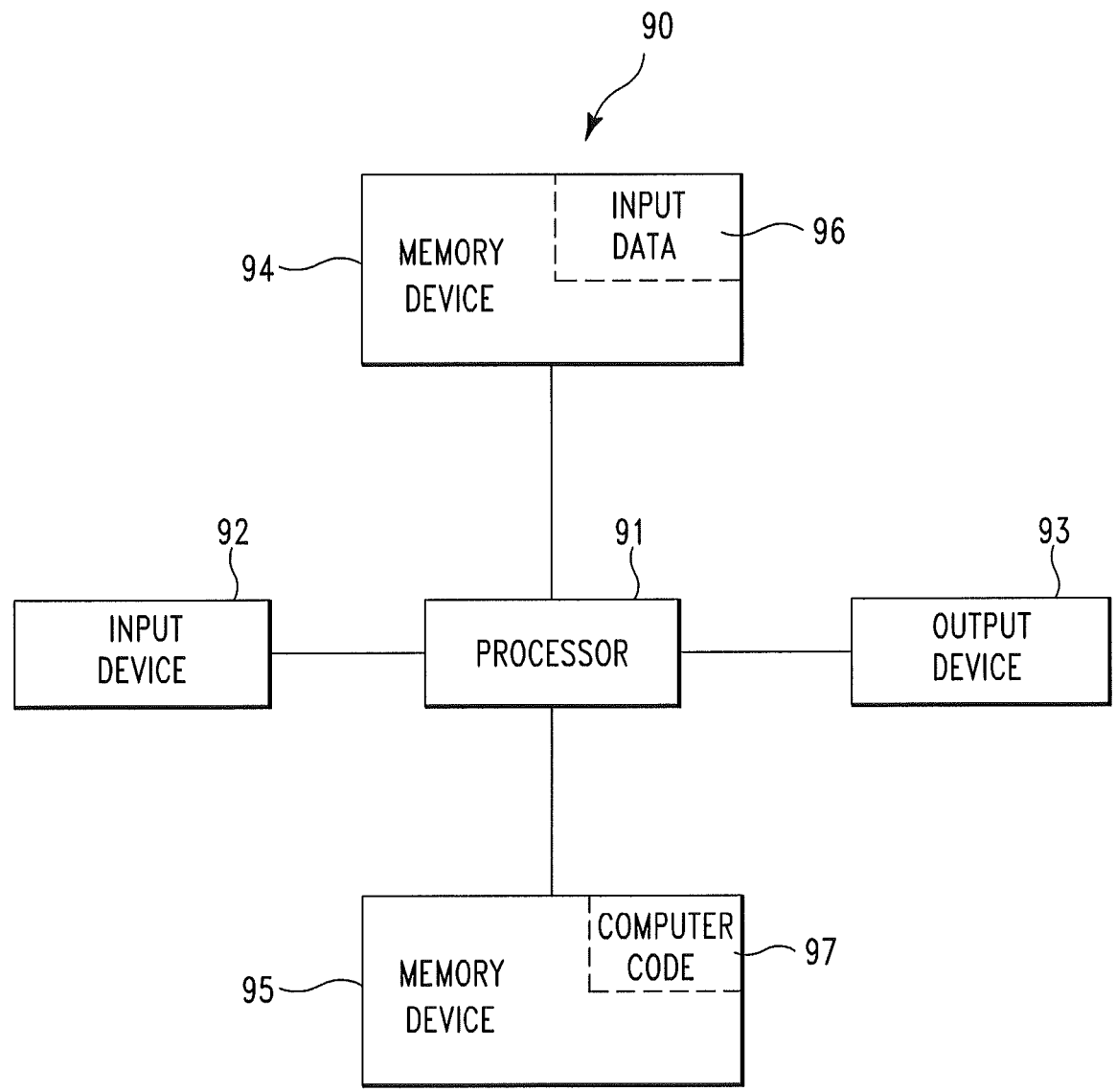
FIG. 3 illustrates an example of a computer system used for generating and modifying a geographical route of travel for a user, in accordance with embodiments of the present invention.

FIG. 3 illustrates an example of a computer system 90 (i.e., GPS transceiver 17 in FIG. 1) used for generating and modifying a geographical route of travel for a user, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for generating and modifying a geographical route of travel for a user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to generate and modify a geographical route of travel for a user. Thus the present invention discloses a process for deploying or integrating computing infrastructure, comprising integrating computer-readable code into the computer system 90, wherein the code in combination with the computer system 90 is capable of performing a method for generating and modifying a geographical route of travel for a user. In another embodiment, the invention provides a business method that performs the process steps of the invention on a subscription, advertising, and/or fee basis. That is, a service provider, such as a Solution Integrator, could offer to generate and modify a geographical route of travel for a user. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A routing method comprising:
    receiving from a user, by a global positioning satellite (GPS) transceiver in a vehicle, a user profile comprising user preference data comprising a slowest speed that said user is willing to travel;
    receiving from said user, by said GPS transceiver, destination location data defining a destination location for said user;
    retrieving from a satellite, by said GPS transceiver, first geospatial coordinate values for a current location of said user and second geospatial coordinate values for said destination location;
    first identifying, by said GPS transceiver, a first geographical route for traveling from said current location to said destination location, said first identifying based on said user profile, said first geospatial coordinate values, and said second geospatial coordinate values;
    retrieving from a plurality of radar traffic speed/density receiving devices, by said GPS transceiver, a plurality of geospatial coordinate values for various locations located along said first geographical route;
    retrieving from a first database, by said GPS transceiver during travel of said vehicle along said first geographical route, current real time traffic speed/traffic density data associated with each geospatial coordinate value of said plurality of geospatial coordinate values;
    retrieving from a second database, by said GPS transceiver during said travel of said vehicle along said first geographical route, historical traffic speed/traffic density data associated with each said geospatial coordinate value of said plurality of geospatial coordinate values;
    performing, by a computer processor of said GPS transceiver, a trending analysis process on said current real time traffic speed/traffic density data;
    performing, by said GPS transceiver, a historical analysis process on said historical traffic speed/traffic density data;
    determining, by said GPS transceiver, if said first geographical route comprises an efficient geographical route for said user to travel from said current location to said destination location, said determining based on said user profile, results of said trending analysis process, and results of said historical analysis process; and
    continuously altering, by said GPS transceiver during said travel of said vehicle and at different locations associated with each said geospatial coordinate value, said first route such that a plurality of different modified routes are generated from said first route and based on said user profile, said results of said trending analysis process, and said results of said historical analysis process, wherein each route of said plurality of different modified routes is comprises a different starting location associated with each said geospatial coordinate value.

2. The method of claim 1, wherein said determining by said GPS transceiver determines that said first geographical route comprises an efficient geographical route for said user to travel from said current location to said destination location, and wherein said method further comprises:
generating, by said GPS transceiver, a map illustrating said first geographical route; and
displaying for said user, by said GPS transceiver, said map.

3. The method of claim 1, wherein said determining by said GPS transceiver determines that said first geographical route does not comprise an efficient geographical route for said user to travel from said current location to said destination location, and wherein said method further comprises:
second identifying, by said GPS transceiver, a second geographical route for traveling from said current location to said destination location, said second geographical route identifying based on said user profile, said first geospatial coordinate values, said second geospatial coordinate values, said results of said trending analysis process, and said results of said historical analysis process;
generating, by said GPS transceiver, a map illustrating said second geographical route; and
displaying for said user, by said GPS transceiver, said map.

4. The method of claim 1, wherein said user preference data comprises user selected information selected from the group consisting of a lowest speed that the user is willing to travel and type of road preferred by said user.

5. The method of claim 1, wherein said GPS transceiver is located within an automobile.

6. The method of claim 1, wherein said various locations are located at specified mileage points along said first geographical route.

7. The method of claim 1, wherein said user preference data further comprises data indicating specified towns or cities that said user is willing to travel through.

8. The method of claim 1, wherein performing said trending analysis process results in a trending assessment associated with current traffic patterns at different sections of said first route as compared to normal traffic patterns at said different sections of said first route.

9. A global positioning satellite (GPS) transceiver comprising a computer processor coupled to a computer-readable memory unit, said memory unit comprising instructions that when executed by the processor implement a routing method comprising:
receiving from a user, by said GPS transceiver in a vehicle, a user profile comprising user preference data comprising a slowest speed that said user is willing to travel;
receiving from said user, by said GPS transceiver, destination location data defining a destination location for said user;
retrieving from satellite, by said GPS transceiver, first geospatial coordinate values for a current location of said user and second geospatial coordinate values for said destination location;
first identifying, by said GPS transceiver, a first geographical route for traveling from said current location to said destination location, said first identifying based on said user profile, said first geospatial coordinate values, and said second geospatial coordinate values;
retrieving from a plurality of radar traffic speed/density receiving devices, by said GPS transceiver, a plurality of geospatial coordinate values for various locations located along said first geographical route;
retrieving from a first database, by said GPS transceiver during travel of said vehicle along said first geographical route, current real time traffic speed/traffic density data associated with each geospatial coordinate value of said plurality of geospatial coordinate values;
retrieving from a second database, by said GPS transceiver during said travel of said vehicle along said first geographical route, historical traffic speed/traffic density data associated with each said geospatial coordinate value of said plurality of geospatial coordinate values;
performing, by said computer processor, a trending analysis process on said current real time traffic speed/traffic density data;
performing, by said GPS transceiver, a historical analysis process on said historical traffic speed/traffic density data;
determining, by said GPS transceiver, if said first geographical route comprises an efficient geographical route for said user to travel from said current location to said destination location, said determining based on said user profile, results of said trending analysis process, and results of said historical analysis process; and
continuously altering, by said GPS transceiver during said travel of said vehicle and at different locations associated with each said geospatial coordinate value, said first route such that a plurality of different modified routes are generated from said first route and based on said user profile, said results of said trending analysis process, and said results of said historical analysis process, wherein each route of said plurality of different modified routes is comprises a different starting location associated with each said geospatial coordinate value.

10. The GPS transceiver of claim 9, wherein said determining by said GPS transceiver determines that said first geographical route comprises an efficient geographical route for said user to travel from said current location to said destination location, and wherein said method further comprises:
generating, by said GPS transceiver, a map illustrating said first geographical route; and
displaying for said user, by said GPS transceiver, said map.

11. The GPS transceiver of claim 9, wherein said determining by said GPS transceiver determines that said first geographical route does not comprise an efficient geographical route for said user to travel from said current location to said destination location, and wherein said method further comprises:
second identifying, by said GPS transceiver, a second geographical route for traveling from said current location to said destination location, said second geographical route identifying based on said user profile, said first geospatial coordinate values, said second geospatial coordinate values, said results of said trending analysis process, and said results of said historical analysis process;
generating, by said GPS transceiver, a map illustrating said second geographical route; and
displaying for said user, by said GPS transceiver, said map.

12. The GPS transceiver of claim 9, wherein said user preference data comprises user selected information selected from the group consisting of a lowest speed that the user is willing to travel and type of road preferred by said user.

13. The GPS transceiver of claim 9, wherein said GPS transceiver is located within an automobile.

14. The GPS transceiver of claim 9, wherein said various locations are located at specified mileage points along said first geographical route.

15. A computer program product, stored on a non-transitory computer readable storage medium comprising a computer readable program code embodied therein, said computer readable program code adapted to be executed by a computer processor of a global positioning satellite (GPS) transceiver to implement a routing method within said GPS transceiver, said method comprising:
   receiving from a user, by said GPS transceiver in a vehicle, a user profile comprising user preference data comprising a slowest speed that said user is willing to travel;
   receiving from said user, by said GPS transceiver, destination location data defining a destination location for said user;
   retrieving from a satellite, by said GPS transceiver, first geospatial coordinate values for a current location of said user and second geospatial coordinate values for said destination location;
   first identifying, by said GPS transceiver, a first geographical route for traveling from said current location to said destination location, said first identifying based on said user profile, said first geospatial coordinate values, and said second geospatial coordinate values;
   retrieving from a plurality of radar traffic speed/density receiving devices, by said GPS transceiver, a plurality of geospatial coordinate values for various locations located along said first geographical route;
   retrieving from a first database, by said GPS transceiver during travel of said vehicle along said first geographical route, current real time traffic speed/traffic density data associated with each geospatial coordinate value of said plurality of geospatial coordinate values;
   retrieving from a second database, by said GPS transceiver during said travel of said vehicle along said first geographical route, historical traffic speed/traffic density data associated with each said geospatial coordinate value of said plurality of geospatial coordinate values;
   performing, by said computer processor, a trending analysis process on said current real time traffic speed/traffic density data;
   performing, by said GPS transceiver, a historical analysis process on said historical traffic speed/traffic density data;
   determining, by said GPS transceiver, if said first geographical route comprises an efficient geographical route for said user to travel from said current location to said destination location, said determining based on said user profile, results of said trending analysis process, and results of said historical analysis process; and
   continuously altering, by said GPS transceiver during said travel of said vehicle and at different locations associated with each said geospatial coordinate value, said first route such that a plurality of different modified routes are generated from said first route and based on said user profile, said results of said trending analysis process, and said results of said historical analysis process, wherein each route of said plurality of different modified routes is comprises a different starting location associated with each said geospatial coordinate value.

16. The computer program product of claim 15, wherein said determining by said GPS transceiver determines that said first geographical route comprises an efficient geographical route for said user to travel from said current location to said destination location, and wherein said method further comprises:
   generating, by said GPS transceiver, a map illustrating said first geographical route; and
   displaying for said user, by said GPS transceiver, said map.

17. The computer program product of claim 15, wherein said determining by said GPS transceiver determines that said first geographical route does not comprise an efficient geographical route for said user to travel from said current location to said destination location, and wherein said method further comprises:
   second identifying, by said GPS transceiver, a second geographical route for traveling from said current location to said destination location, said second geographical route identifying based on said user profile, said first geospatial coordinate values, said second geospatial coordinate values, said results of said trending analysis process, and said results of said historical analysis process;
   generating, by said GPS transceiver, a map illustrating said second geographical route; and
   displaying for said user, by said GPS transceiver, said map.

18. The computer program product of claim 15, wherein said user preference data comprises user selected information selected from the group consisting of a lowest speed that the user is willing to travel and type of road preferred by said user.

19. The computer program product of claim 15, wherein said GPS transceiver is located within an automobile.

20. The computer program product of claim 15, wherein said various locations are located at specified mileage points along said first geographical route.

21. A process for supporting computer infrastructure, said process comprising providing at least one support service for at least one of creating, integrating, hosting, maintaining, and deploying computer-readable code in a global positioning satellite (GPS) transceiver comprising a computer processor coupled to a computer readable memory unit, wherein the code in combination with the computer processor of the GPS transceiver is configured to be executed by the computer processor to perform a routing method, said method comprising:
   receiving from a user, by said GPS transceiver in a vehicle, a user profile comprising user preference data comprising a slowest speed that said user is willing to travel;
   receiving from said user, by said GPS transceiver, destination location data defining a destination location for said user;
   retrieving from a satellite, by said GPS transceiver, first geospatial coordinate values for a current location of said user and second geospatial coordinate values for said destination location;
   first identifying, by said GPS transceiver, a first geographical route for traveling from said current location to said destination location, said first identifying based on said user profile, said first geospatial coordinate values, and said second geospatial coordinate values;
   retrieving from a plurality of radar traffic speed/density receiving devices, by said GPS transceiver, a plurality of geospatial coordinate values for various locations located along said first geographical route;
   retrieving from a first database, by said GPS transceiver during travel of said vehicle along said first geographical route, current real time traffic speed/traffic density data associated with each geospatial coordinate value of said plurality of geospatial coordinate values;
   retrieving from a second database, by said GPS transceiver during said travel of said vehicle along said first geographical route, historical traffic speed/traffic density data associated with each said geospatial coordinate value of said plurality of geospatial coordinate values;

performing, by said computer processor, a trending analysis process on said current real time traffic speed/traffic density data;

performing, by said GPS transceiver, a historical analysis process on said historical traffic speed/traffic density data;

determining, by said GPS transceiver, if said first geographical route comprises an efficient geographical route for said user to travel from said current location to said destination location, said determining based on said user profile, results of said trending analysis process, and results of said historical analysis process; and continuously altering, by said GPS transceiver during said travel of said vehicle and at different locations associated with each said geospatial coordinate value, said first route such that a plurality of different modified routes are generated from said first route and based on said user profile said results of said trending analysis process, and said results of said historical analysis process, wherein each route of said plurality of different modified routes is comprises a different starting location associated with each said geospatial coordinate value.

22. The process of claim 21, wherein said determining by said GPS transceiver determines that said first geographical route comprises an efficient geographical route for said user to travel from said current location to said destination location, and wherein said method further comprises:

generating, by said GPS transceiver, a map illustrating said first geographical route; and displaying for said user, by said GPS transceiver, said map.

23. The process of claim 21, wherein said determining by said GPS transceiver determines that said first geographical route does not comprise an efficient geographical route for said user to travel from said current location to said destination location, and wherein said method further comprises:

second identifying, by said GPS transceiver, a second geographical route for traveling from said current location to said destination location, said second geographical route identifying based on said user profile, said first geospatial coordinate values, said second geospatial coordinate values, said results of said trending analysis process, and said results of said historical analysis process;

generating, by said GPS transceiver, a map illustrating said second geographical route; and displaying for said user, by said GPS transceiver, said map.

24. The process of claim 21, wherein said various locations are located at specified mileage points along said first geographical route.

* * * * *